United States Patent [19]

Fitchew

[11] 4,099,217
[45] Jul. 4, 1978

[54] PROTECTION CIRCUITS

[75] Inventor: Kenneth David Fitchew, Ipswich, England

[73] Assignee: The Post Office, London, England

[21] Appl. No.: 767,950

[22] Filed: Feb. 11, 1977

[30] Foreign Application Priority Data

Feb. 18, 1976 [GB] United Kingdom ............... 6313/76

[51] Int. Cl.² ........................................... H02H 9/04
[52] U.S. Cl. ................................. 361/56; 330/207 P; 361/119
[58] Field of Search ............... 361/56, 111, 112, 119, 361/120; 330/207 P; 179/170 R, 170 J

[56] References Cited

U.S. PATENT DOCUMENTS 3,644,787 2/1972 Hamilton ........................... 361/56

FOREIGN PATENT DOCUMENTS 2,508,283 2/1975 Fed. Rep. of Germany ......... 361/56
1,037,958 8/1966 United Kingdom ................. 361/119

Primary Examiner—Harry E. Moose, Jr.
Attorney, Agent, or Firm—Cushman, Darby & Cushman

[57] ABSTRACT

A surge protection circuit for repeaters in a co-axial telecommunications cable where the power supply is through the cable conductors includes a cold-cathode discharge tube connected so as to provide a discharge path, when a surge occurs, for a capacitor through the power tapping resistor so that the discharge current through the power tapping resistor is in opposition to the normal current through the resistor.

6 Claims, 1 Drawing Figure

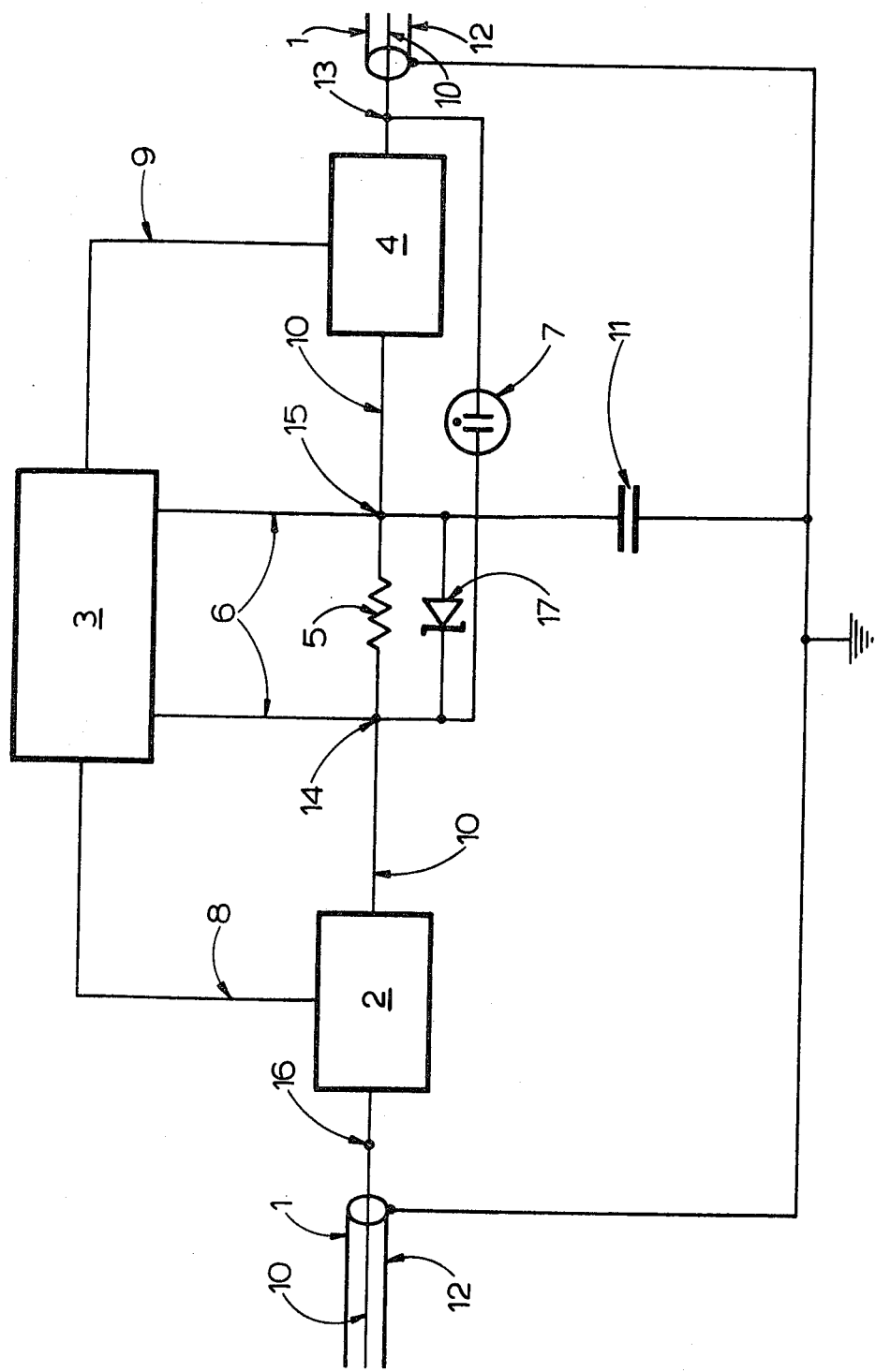

PROTECTION CIRCUITS

This invention relates to surge protection circuits. In particular, but not exclusively, it relates to surge protection circuits for repeaters in telecommunications cables.

In the design and construction of telecommunications cables and transmission systems, one of the important practical details which must be taken account of is the protection of the cable or system from electrical surges. Such surges might be caused by lightning or other extraneous electrical influences, but, particularly in underground or undersea cables, a surge may result from a fault in the cable itself. Commonly, in underground or undersea cables of coaxial construction the central conductor is used to supply power to the repeater amplifiers spaced along the cable. One method of thus supplying power to the repeater amplifiers is to pass a current from one end of the central conductor to the other and to insert in series with the central conductor of the cable a power-tapping resistor at each repeater location. Thus, a voltage is generated across the power-tapping resistor by the current flowing therethrough, and this voltage may be applied to the power input terminals of the amplifier. Commonly a voltage of 10–20V is required at each repeater and it will be obvious that in any system wherein a large number of repeaters is used a potential of several thousand volts may exist between the central conductor and the outer conductor. Should a short-circuit between the central and outer conductors occur a surge of considerable magnitude can be generated.

It is common practice to use a device such as a Zener diode or gas discharge tube connected across the power-tapping resistor in order to limit the potential which is generated across the resistor, but the characteristics of such devices are such that the residual voltage across the power-tapping resistor will often be in excess of the normal amplifier supply voltage. At the same time, the transmission surge will have increased the power incident upon the amplifier via the signal paths through the repeater, and thus the amplifier can be required to operate under elevated supply voltage conditions and high signal input conditions concurrently. This combination of operating parameters is undesirable, for a variety of reasons such as damage to, or shortening of the service life of, components in the amplifier. The problem is particularly serious in undersea cables, where access to a repeater is difficult.

It is therefore one object of the present invention to provide an improved surge protection circuit for telecommunications cable repeaters.

According to the invention there is provided a surge protection circuit for a telecommunications cable repeater of the type wherein a voltage supply for the repeater is derived from a power-tapping resistor in series with a first conductor of said cable, said surge protection circuit comprising a voltage sensitive discharge means effectively connected in parallel with said power-tapping resistor and further comprising a capacitor connected directly between one terminal of said power-tapping resistor and earth.

According to a second aspect of the present invention there is provided a surge protection circuit for a telecommunications cable repeater of the type wherein a voltage supply for the repeater is derived from a power-tapping resistor in series with a first conductor of said cable and wherein there is additionally power separating filters in series with the first conductor of said cable wherein said surge protection circuit comprises voltage sensitive discharge means connected in parallel with the series combination of said power-tapping resistor and a power separating filter, said surge protection circuit further comprising a capacitor connected directly between the end of said power-tapping resistor remote from the end thereof connected to said voltage sensitive discharge means and earth.

According to a third aspect of the present invention there is provided a surge protection circuit for a telecommunications cable repeater of the type wherein a voltage supply for the repeater is derived from a power-tapping resistor having a first and a second end in series with the first conductor of said cable, wherein a voltage sensitive discharge means is connected between the first end of said power-tapping resistor and a point on the first conductor of said cable adjacent the input to the repeater remote from the first end of said power-tapping resistor, said surge protection circuit further comprising a capacitor connected between the second end of said power tapping resistor and earth.

Preferably said voltage sensitive discharge means is a cold-cathode discharge tube.

The invention will now be described, by way of example, with reference to the accompanying drawing which shows a schematic diagram of a telecommunications cable repeater including a surge protection circuit according to the invention.

Referring to FIG. 1, there is shown diagrammatically a coaxial telecommunications cable 1 at a location where a repeater amplifier is situated. The use of repeater amplifiers in telecommunications cables of this sort is well known and will not therefore be further described. A typical arrangement has an amplifier 3 to which the signal from the cable 1 is fed via power separating filters 2 and 4 and, respectively, signal paths 8 and 9. The respective amplifier signals are also returned to the cable via the said signal paths 9 and 8 and the power separating filters 4 and 2.

Frequency division of the signals in the opposite direction enables a single signal path to be used. In a practical design of repeater it is necessary to provide for amplification in both directions of transmission; a solution often used is to provide two unidirectional amplifiers interconnected with filters to provide an amplified transmission path for each frequency band in the direction in which that band is used for transmission. In this Specification the term amplifier will be used to include the combination of filters and amplifiers used to provide bidirectional amplification in such a cable.

Power for the repeater amplifier is obtained by feeding a current along the central conductor 10 of the cable 1 and, because this current is direct, it passes through the power separating filters 2 and 4 to the power-tapping resistor 5 across which a voltage is therefore produced. This voltage is applied to the power input to the amplifier 3 by the leads 6.

A gas discharge tube 7 is connected in parallel with the series combination of the power-tapping resistor 5 and the power supply filter 4, and the capacitor 11 is connected directly to earth from the end of the power-tapping resistor 5 adjacent to the power separating filter 4. It should be noted that the earth referred to is a true earth, and not a local repeater amplifier earth. A Zener diode 17 is connected across the power-tapping resistor 5.

The particular arrangement of the surge protection circuit shown in FIG. 1 is particularly intended for use in systems where the potential of the inner conductor 10 is positive with respect to the outer conductor 12, if the direction of current feed along the inner conductor 10 is from left to right as seen in FIG. 1.

The operation of the circuit in FIG. 1 can be explained by considering a short-circuit between the inner conductor 10 and the outer conductor 12 of the coaxial telecommunications cable to have occurred at some point in the cable to the right of the repeater as shown in FIG. 1. The action of a short-circuit will be to cause the inner conductor 10 to discharge to the outer conductor 12 and thus to cause a negative going voltage pulse to travel along the inner conductor 10 of the cable towards the repeater shown in FIG. 1. It will be apparent that should the pulse arrive at the power-tapping resistor 5 its full magnitude will be applied across the power-tapping resistor 5 and thence, by the leads 6, to the amplifier. At the same time a transmission pulse would pass through the power separating filter 4 and via lead 9 to the amplifier 3. Thus the amplifier 3 would have impressed upon it a high transmission voltage at the same time as the supply voltage might be increased. The Zener diode 17 will however conduct if the voltage pulse is greater than its avalanche potential. But, because of the finite avalanche potential of the Zener diode, the potential across the power-tapping resistor 5 may be greater than normal, and in any case it is desirable that the supply voltage should be reduced during the period of the transmission surge. The gas discharge tube 7 will have started to conduct when the voltage pulse arrived at point 13 and will of course assist the Zener diode 17 in providing an alternative by-pass path around the power-tapping resistor 5. However, this is not the primary function of the gas discharge tube 7. It will be seen that the capacitor 11 will attempt to discharge itself by a current flowing from itself towards point 13 via point 15, and it will be seen that the conducting path present through the gas discharge tube 7 when the tube is conducting provides an alternative path along which some of the current from the discharging capacitor 11 will pass. This alternative path is via the power-tapping resistor 5, point 14, the gas discharge tube 7 and thence to point 13. It will be apparent by an inspection of FIG. 1 that the current passing via the gas discharge tube 7 from the capacitor 11 to the point 13 will be passing through the power-tapping resistor 5 in a direction opposite to that which the normal current passes, and will therefore reduce the aggregate value of the current through the power-tapping resistor 5. It will be obvious therefore that the voltage applied to the amplifier 3 by the leads 6 will be reduced below that value which would otherwise obtain.

Although a gas discharge tube has been used in the example, it will be apparent that any voltage sensitive discharge means having a similar discharge characteristic could be used instead. If it is desired to use a negative voltage on the central conductor 10 for the purposes of power supply to the repeater amplifiers, it will be appreciated by those skilled in the art that the necessary adaptations to the circuit can be made.

The gas discharge tube 7 would then be connected between point 16 and point 15 and the capacitor 11 would be connected between point 14 (instead of point 15) and earth.

It will also be appreciated that the precise point on the central conductor to which the end of the gas discharge tube 7 remote from the end connected to the power tapping resistor 5 is connected does not affect the principle of the operation of the circuit, but only the detailed design.

In particular, in a practical use of the invention it may be desired to include components, not relevant to the power supply arrangements, inbetween the inputs to the repeater and the power separating filters. The end of the voltage sensitive discharge means not connected to the end of the power tapping resistor can be, in this case, connected to the inner conductor of the cable on either side of these components.

I claim:

1. A surge protection circuit for a telecommunications cable repeater of the type wherein a voltage supply for the repeater is derived from a power-tapping resistor in series with a first conductor of said cable, said surge protection circuit comprising a voltage sensitive discharge means effectively connected in parallel with said power-tapping resistor and further comprising a capacitor connected directly between one terminal of said power-tapping resistor and earth.

2. A surge protection circuit as claimed in Claim 1 in which said voltage-sensitive discharge means is a cold-cathode discharge tube.

3. A surge protection circuit for a telecommunications cable repeater of the type wherein a voltage supply for the repeater is derived from a power-tapping resistor in series with a first conductor of said cable and wherein there is additionally power separating filters in series with the first conductor of said cable wherein said surge protection circuit comprises voltage sensitive discharge means connected in parallel with the series combination of said power-tapping resistor and a power separating filter, said surge protection circuit further comprising a capacitor connected directly between the end of said power-tapping resistor remote from the end thereof connected to said voltage sensitive discharge means and earth.

4. A surge protection circuit as claimed in claim 3 in which said voltage-sensitive discharge means is a cold-cathode discharge tube.

5. A surge protection circuit for a telecommunications cable repeater of the type wherein a voltage supply for the repeater is derived from a power-tapping resistor having a first and a second end in series with the first conductor of said cable, wherein a voltage sensitive discharge means is connected between the first end of said power-tapping resistor and a point on the first conductor of said cable adjacent the input to the repeater remote from the first end of said power-tapping resistor, said surge protection circuit further comprising a capacitor connected between the second end of said power-tapping resistor and earth.

6. A surge protection circuit as claimed in claim 5 in which said voltage sensitive discharge means is a cold-cathode discharging tube.

* * * * *